US012497235B2

(12) United States Patent
Binetti

(10) Patent No.: US 12,497,235 B2
(45) Date of Patent: Dec. 16, 2025

(54) SLIDING TILT LOADER

(71) Applicant: Impact Automation, Inc., Columbia, MD (US)

(72) Inventor: Paul T. Binetti, Columbia, MD (US)

(73) Assignee: Impact Automation, Inc., Columbia, MD (US)

(*) Notice: Subject to any disclaimer, the term of this patent is extended or adjusted under 35 U.S.C. 154(b) by 353 days.

(21) Appl. No.: 18/210,973

(22) Filed: Jun. 16, 2023

(65) Prior Publication Data

US 2024/0417163 A1 Dec. 19, 2024

(51) Int. Cl.
*B65D 88/56* (2006.01)

(52) U.S. Cl.
CPC .......... *B65D 88/56* (2013.01); *B65D 2588/54* (2013.01)

(58) Field of Classification Search
CPC ...... B65G 11/12; B65G 11/123; B65G 57/02; B65G 57/28; B65G 65/23; B65B 5/12; B65F 3/046; B65D 88/56; B65D 2588/54
USPC ....... 414/419, 420, 421, 446, 480, 481, 485, 414/537, 810; 193/8, 14; 294/68.26
See application file for complete search history.

(56) References Cited

U.S. PATENT DOCUMENTS

| 3,978,999 | A   | * | 9/1976  | Ryder      | B65G 65/23 414/404 |
| 6,276,890 | B1  | * | 8/2001  | Pratt      | B60P 3/122 414/494 |
| 7,547,176 | B2  | * | 6/2009  | Blackwell  | B07C 1/00 141/153 |
| 2009/0110523 | A1 | * | 4/2009 | Geoffrion | B60P 3/06 410/3 |
| 2013/0272832 | A1 | * | 10/2013 | Wargo    | B65G 59/08 414/592 |
| 2015/0122611 | A1 | * | 5/2015  | Lykkegaard | B65G 11/123 198/804 |

FOREIGN PATENT DOCUMENTS

| EP | 2354004 A1 | * | 8/2011 | ............. | B65G 57/28 |
| EP | 3945044 A1 | * | 2/2022 | ............. | B65G 41/001 |

* cited by examiner

*Primary Examiner* — Saul Rodriguez
(74) *Attorney, Agent, or Firm* — Rahman LLC

(57) ABSTRACT

A system includes a frame with a back rail and a ground rail. The back rail and the ground rail are positioned transverse to each other. A guide is attached to the ground rail. A sliding tilt loader apparatus includes a bucket; a chute; and a first pivot mechanism attached to a first end of a rear portion of the bucket. The first pivot mechanism is to translate along the guide. A second pivot mechanism is attached to a second end of the rear portion of the bucket. Rotation of the first pivot mechanism and the second pivot mechanism coincide with tilting of the chute and the bucket causing the chute to angularly rotate and align with the bucket upon the chute and bucket reaching a completed tilt position.

18 Claims, 15 Drawing Sheets

SLIDING TILT LOADER

BACKGROUND

Technical Field

The embodiments herein generally relate to mail loading equipment and systems, and more particularly to slides or chutes for transferring parcels such as mail, envelopes, and packages into another container for transport.

Description of the Related Art

When mail and other parcels are sorted by a mailing sorting system, the parcels typically have to be loaded into a container for further transport on a delivery truck to another location. Traditional container loaders pivot in one spot, typically above the center of mass. By rotating the containers from this pivot point the container is lifted several inches off the ground. Unfortunately, this puts the load height of the container high off the ground, which poses safety and efficiency concerns. These types of loaders typically are fed by a chute. The chute has a gate that only opens and allows product to discharge into the container when the loader is tilted into a load position. This is a fixed position. Before the loader can be rotated back to its home position where the container can be moved out of the loader, the chute gate must be closed. However, with one fixed position to load, product can never fill the container uniformly. For example, product may accumulate on one side in the container while the opposite side remains relatively empty, and when the container is rotated back to its home position, the product may become damaged due to resettling, etc. within the container. Accordingly, there remains a need to overcome the limitations of the conventional parcel loading systems.

SUMMARY

In view of the foregoing, an embodiment herein provides a system comprising a frame comprising a back rail; a ground rail, wherein the back rail and the ground rail are positioned transverse to each other; and a guide attached to the ground rail. The system further comprises a sliding tilt loader apparatus comprising a bucket; a chute; a first pivot mechanism attached to a first end of a rear portion of the bucket, wherein the first pivot mechanism is to translate along the guide; and a second pivot mechanism attached to a second end of the rear portion of the bucket, wherein rotation of the first pivot mechanism and the second pivot mechanism coincide with tilting of the chute and the bucket causing the chute to angularly rotate and align with the bucket upon the chute and bucket reaching a completed tilt position.

The system may further comprise a third pivot mechanism attached to a first end of a rear portion of the chute. The third pivot mechanism may be attached to the back rail. The system may further comprise an actuator mechanism operatively connected to the rear portion of the bucket, wherein the actuator mechanism initiates the tilting of the bucket causing the first pivot mechanism and the second pivot mechanism to rotate, and thereby causing the chute to tilt with the bucket. The bucket is to accommodate a container that tilts along with the bucket, and the chute is to angularly align with the container upon the chute and the bucket reaching the completed tilt position. The first pivot mechanism is to rotatably translate to allow the bucket to tilt. The completed tilt position comprises 45°.

The system may further comprise a wheel attached to the ground rail. The frame may further comprise a cross rail positioned transverse to the ground rail and parallel to the back rail. The actuator mechanism may be attached to the cross rail. The bucket may comprise an open front portion comprising an angled front frame; an opened top portion; a closed bottom portion; and a partially closed side portion, wherein the rear portion is closed. The chute may comprise a first sliding portion; an upright sidewall extending from the first sliding portion; and a second sliding portion, wherein the second sliding portion is to telescopically extend into the bucket in the completed tilt position. The system may further comprise one or more control switches to control the actuator mechanism.

Another embodiment provides a sliding tilt loader apparatus comprising a bucket; a chute; a pair of first pivot mechanisms attached to a first end of a rear portion of the bucket; and a pair of second pivot mechanisms attached to a second end of the rear portion of the bucket, wherein tilting of the chute and the bucket causes the chute to angularly rotate and align with the bucket until the chute and bucket reaches a completed tilt position. The apparatus may further comprise a pair of third pivot mechanisms attached to a first end of a rear portion of the chute.

The apparatus may further comprise an actuator mechanism operatively connected to the rear portion of the bucket, wherein the actuator mechanism initiates the tilting of the bucket causing the pair of first pivot mechanisms and the second pair of pivot mechanisms to rotate, and thereby causing the chute to tilt with the bucket. The apparatus may further comprise a pair of linear actuators attached to the rear portion of the bucket; and a pair of linear actuator guides operatively connected to the pair of linear actuators, wherein the pair of linear actuators are to slide with respect to the pair of linear actuator guides upon tilting of the bucket. The pair of first pivot mechanisms is to rotatably translate to allow the bucket to tilt. The bucket may be initially at rest at a horizontal position prior to tilting, and the pair of second pivot mechanisms is to slide at a fixed angle to the horizontal position. The pair of first pivot mechanisms is to translate with respect to the horizontal position upon tilting, and wherein the pair of first pivot mechanisms remain at a stationary vertical position prior, during, and after tilting.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Figure 1:
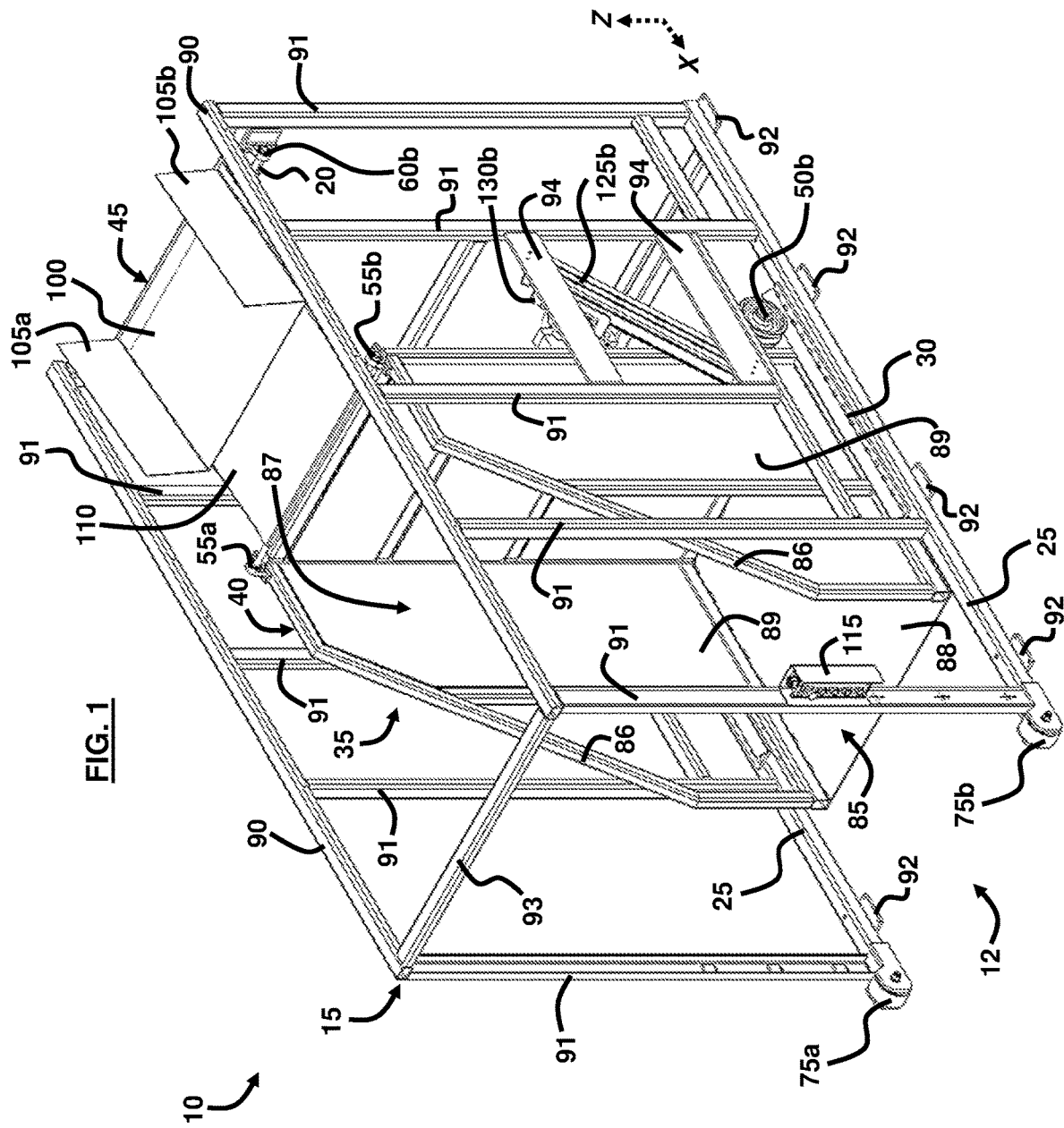
FIG. 1 is a schematic diagram illustrating a front perspective view of a system in a home (non-tilt) position, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Moreover, when an element is referred to as being "connected", "operatively connected", or "coupled" to another element, it can be directly connected or coupled to the other element or intervening elements may be present. Conversely, when an element is referred to as being "directly connected" or "directly coupled" to another element, there are no intervening elements present.

Furthermore, although the terms "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprise(s)", "comprising", "include(s)", and/or "including" when used herein specify the presence of stated features, integers, steps, operations, elements, and/or components, but do not preclude the presence or addition of one or more other features, integers, steps, operations, elements, components, and/or groups thereof.

The embodiments herein provide a solution to the traditional container loader by addressing several issues such as the high load height problem and the one fixed load position problem described above. For the first issue, the embodiments herein minimize the load height by changing how a bucket on the loader pivots. Instead of one fixed pivot point, the embodiments herein have at least two pivot points. A first pivot (upper pivot) allows the pivot point to slide at a fixed angle to the horizontal. A second pivot (ground pivot) located at the bottom of the bucket, allows the bucket to roll along the horizontal (is not lifted off the ground). The combination of these two pivots allows for the top of the bucket to lower further than a traditional loader. The loader may be actuated by a hydraulic or electric actuator to create the motion. The second issue addressed by the embodiments herein, is one fixed load position. According to the embodiments herein, a chute is attached to the bucket. As the bucket rotates, the chute also rotates and articulates with the bucket. This is accomplished by allowing the chute to telescope (articulate) in and out as it rotates. By allowing the chute to travel with the bucket, the bucket can be filled at any position. As the container in the bucket begins to fill the bucket can be rotated allowing the fill to be more uniform and thus filling the container more than a traditional loader. Referring now to the drawings, and more particularly to FIGS. 1 through 15, where similar reference characters denote corresponding features consistently throughout the figures, there are shown preferred embodiments. In the drawings, the size and relative sizes of components, layers, and regions, etc. may be exaggerated for clarity.

The system 10 and apparatus 35 may comprise multiple components, which may be individually manufactured and then assembled together for delivery to a user's location. Alternatively, the components may be assembled together at the user's location. The various components and sub-assemblies of the system 10 and apparatus 35 may comprise any suitable material that is sufficiently mechanically strong to withhold the weight of several hundred pounds of parcel that may be loaded onto the system 10 and apparatus 35 at any particular time. For example, the material may comprise metal including steel, aluminum, and composite metals and alloys, or combinations thereof. In other examples, the material may comprise wood and high-strength plastic such as fiber reinforced plastic, or combinations thereof. Accordingly, the material may comprise transparent, translucent, and opaque materials, or combinations thereof. Additionally, the various components or sub-assemblies of the system 10 and apparatus 35 may be joined together using any suitable type of retaining or fastening member such as screws, bolts, pins, pegs, nails, rivets, hinges, straps, high-strength tape, adhesives, magnets, electrical switches or locks, or combinations thereof. Moreover, in an example, the various components or sub-assemblies of the system 10 and apparatus 35 may be treated with a low-friction paint or coating to provide for enhanced sliding of parcels on the system 10 and apparatus 35. Examples of such paints or coatings include tungsten disulfide, molybdenum disulfide, Teflon® (available from The Chemours Company FC, LLC, Delaware, USA), and Xylan® (available from PPG Industries Ohio, Inc., Ohio, USA), or combinations thereof. For representative purposes, in FIGS. 1(A) through 5(B), the various components and sub-assemblies are shown as being formed of sheet metal, which may contain metal stamping or other types of metal fasteners such as tabs, rivets, screws, or other types of joints. These are merely examples, and the embodiments herein are not restricted to these particular types of fasteners, or any fasteners depending on the type of material used to construct the system 10 and apparatus 35. Additionally, as indicated above, any suitable type of retaining mechanisms may be utilized to assemble the system 10 and apparatus 35.

FIGS. 1 through 15 illustrate a system 10 comprising a frame 15 comprising a back rail 20 and a ground rail 25. In some examples, the frame 15 may be welded together or the various sub-components of the frame 15 may be connected together using any suitable retaining mechanism (screws, nails, bolts, etc.). In an example, there may be multiple ground rails 25 in accordance with the embodiments herein. According to an example, the back rail 20 and the ground rail 25 are positioned transverse to each other. The system 10 further comprises a guide 30 attached to the ground rail 25. The system 10 further comprises a sliding tilt loader apparatus 35 comprising a bucket 40, a chute 45, and a first pivot mechanism 50a or 50b attached to a first end 51 of a rear portion 52 of the bucket 40. The first pivot mechanism 50a or 50b is to translate along the guide 30. The system 10 further comprises a second pivot mechanism 55a or 55b attached to a second end 53 of the rear portion 52 of the bucket 40. The rotation of the first pivot mechanism 50a or 50b and the second pivot mechanism 55a or 55b coincide with tilting of the chute 45 and the bucket 40 causing the chute 45 to angularly rotate and align with the bucket 40 upon the chute 45 and bucket 40 reaching a completed (i.e., full) tilt position from an original home (non-tilt) position.

The system 10 may further comprise a third pivot mechanism 60a or 60b attached to a first end of a rear portion of the chute 45. The third pivot mechanism 60a or 60b may be attached to the back rail 20. According to various examples, each of the first pivot mechanism 50a or 50b, the second pivot mechanism 55a or 55b, and the third pivot mechanism 60a or 60b may be any suitable type of mechanical, electrical, electro-mechanical, magnetic, or optical device capable of creating a pivoting or rotational movement about an axis in order to cause the connected structures (e.g., the bucket 40 and chute 45) to pivot or rotate. In an example, each of the first pivot mechanism 50a or 50b, the second pivot mechanism 55a or 55b, and the third pivot mechanism 60a or 60b may be wheels that rotate about an axel (not shown) to create the pivoting/rotating action.

According to the embodiments herein, the third pivot mechanism 60a or 60b is affixed to the back rail 20 such that the third pivot mechanism 60a or 60b only rotates but does not translate. Furthermore, according to the embodiments herein, the second pivot mechanisms 55a or 55b are affixed to the second end 53 of the rear portion 52 of the bucket 40 such that the second pivot mechanisms 55a or 55b only rotate as the bucket 40 rotates (e.g., tilts), but the second pivot mechanisms 55a or 55b do not translate. Moreover, according to the embodiments herein, the first pivot mechanism 50a or 50b is affixed to the first end 51 of a rear portion 52 of the bucket 40 such that as the bucket 40 rotates (e.g., tilts), the first pivot mechanism 50a or 50b translates along the guide 30 to allow the bucket 40 to tilt in a controlled and uniform manner.

Figure 3:
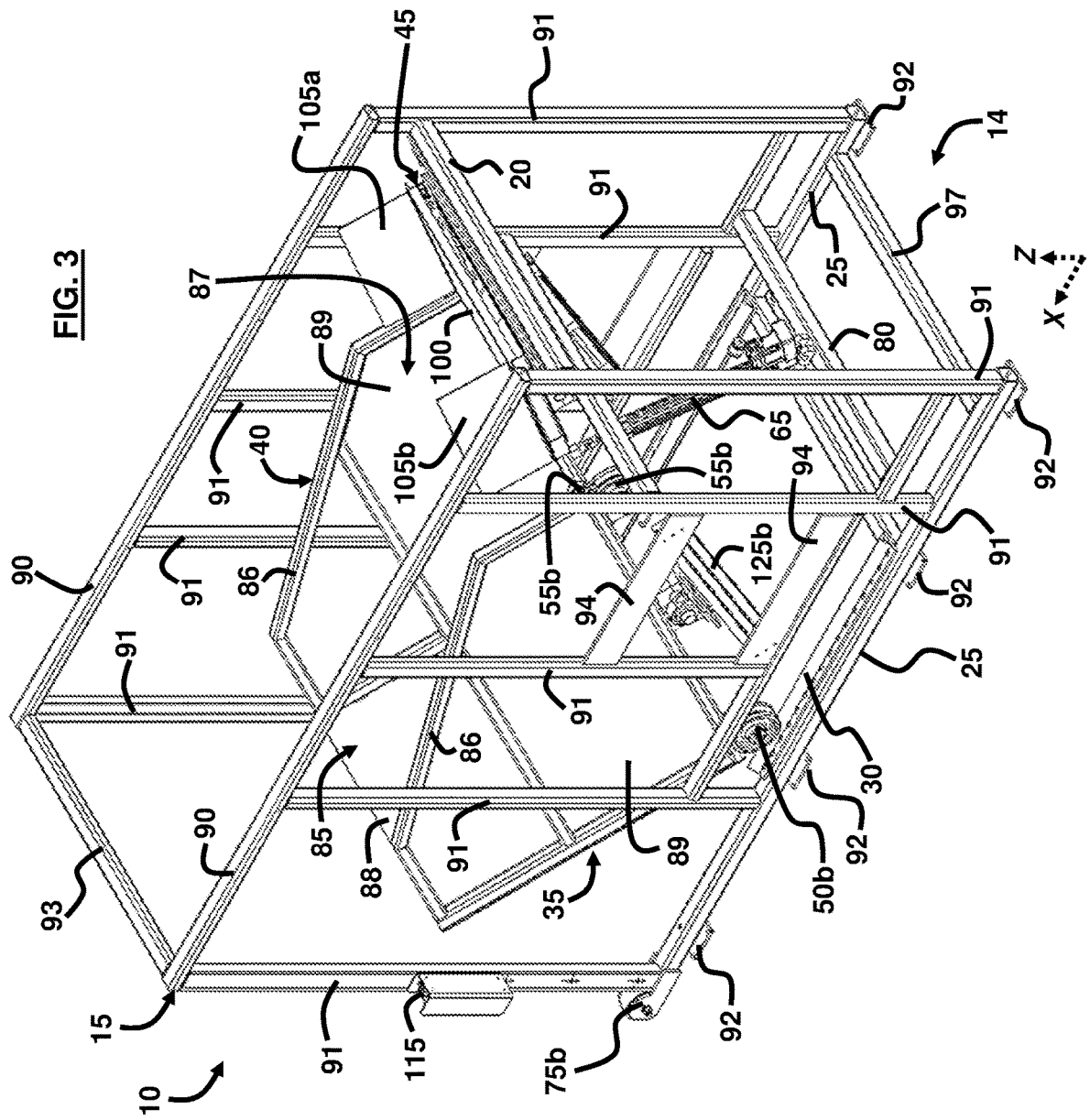
FIG. 3 is a schematic diagram illustrating a rear perspective view of the system of FIG. 1 in a full tilt position, according to an embodiment herein.

As shown in FIG. 3, the system 10 may further comprise an actuator mechanism 65 operatively connected to the rear portion 52 of the bucket 40. The actuator mechanism 65 initiates the tilting of the bucket 40 causing the first pivot mechanism 50a or 50b and the second pivot mechanism 55a or 55b to rotate, and thereby causing the chute 45 to tilt with the bucket 40. The actuator mechanism 65 may be any suitable type of mechanical, electrical, electro-mechanical, magnetic, hydraulic, or optical device capable of driving the motion of the bucket 40 to tilt position and return back to a non-tilt (home) position. In an example, the actuator mechanism 65 may comprise a rod-and-piston mechanism such as a gas strut or pneumatic piston, although other types of actuators are possible in accordance with the embodiments herein.

Figure 5:
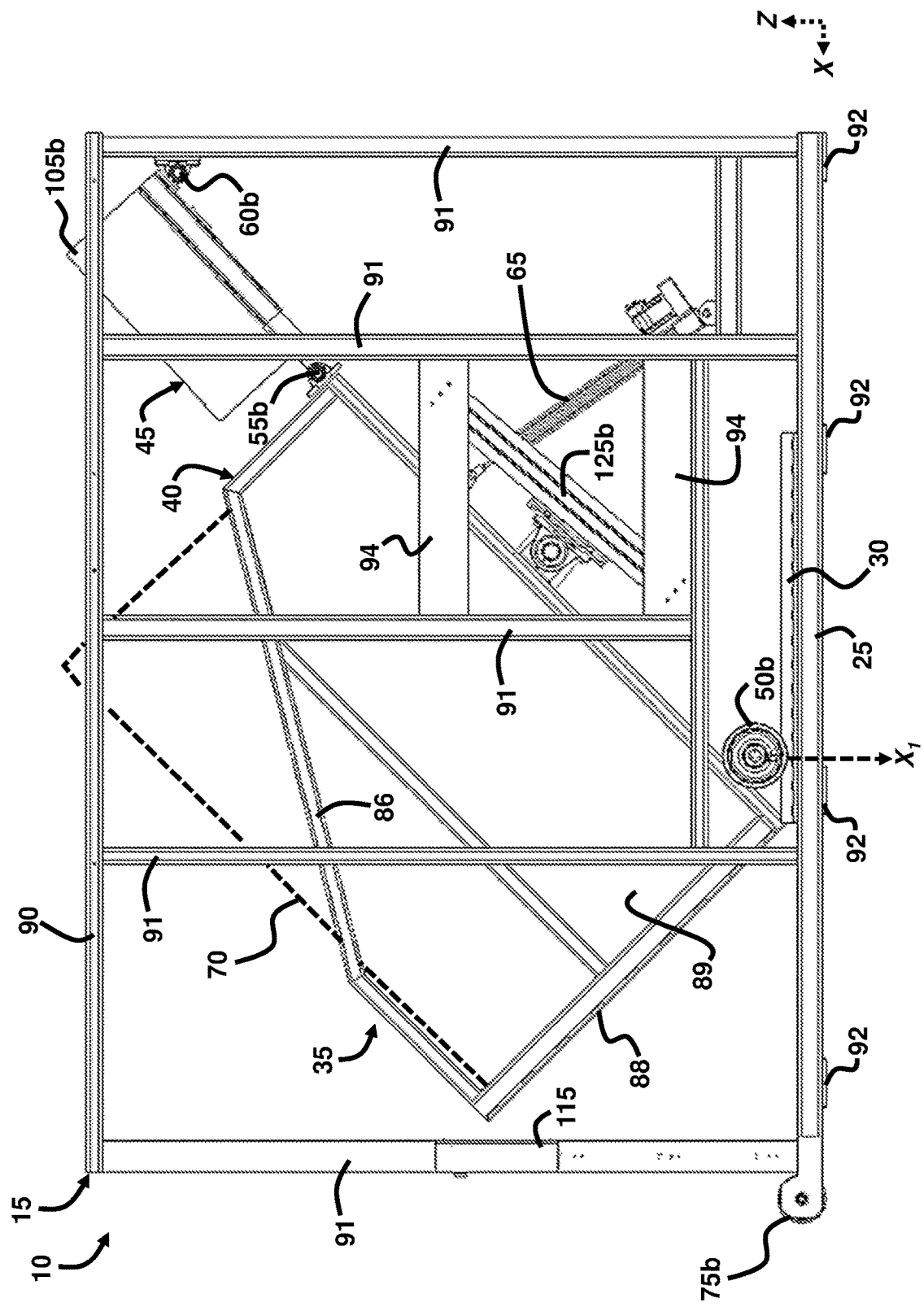
FIG. 5 is a schematic diagram illustrating a right side view of the system of FIG. 1 in a full tilt position, according to an embodiment herein.

As shown in FIG. 5, the bucket 40 is to accommodate a container 70 that tilts along with the bucket 40, and the chute 45 is to angularly align with the container 70 upon the chute 45 and the bucket 40 reaching the completed tilt position. The container 70 may have any suitable shape or configuration. In some examples, the container 70 may be positioned into and out of the bucket 40 using a forklift, cart, hand truck, dolly, or manually lifted by a user. In an example, the container 70 may be a mail container that holds mail parcels, envelopes, and packages, etc. The first pivot mechanism 50a or 50b is to rotatably translate to allow the bucket 40 to tilt. In an exemplary configuration, the completed tilt position comprises 45°. In another example, the completed tilt position comprises any angle between 30-60°. However, other angles are possible, and the embodiments herein are not restricted to a particular angle or range of angles.

The system 10 may further comprise a wheel(s) 75a, 75b attached to the ground rail 25. The wheel(s) 75a, 75b allow for the system 10 to be mobile and moved from location-to-location and stored as necessary. The frame 15 may further comprise a cross rail 80 positioned transverse to the ground rail 25 and parallel to the back rail 20. The actuator mechanism 65 may be attached to the cross rail 80. Additionally, the frame 15 may further comprise a plurality of upper frame rails 90 positioned opposite to the ground rail 25. An upper cross-bar 93 may be positioned between opposite upper frame rails 90 such that the upper cross-bar 93 is positioned in the front 12 of the system 10. Moreover, the frame 15 may further comprise a lower cross-bar 97 positioned between opposite ground rails 25 such that the lower cross-bar 97 is substantially parallel to the upper cross-bar 93, and such that the lower cross-bar is positioned in the rear 14 of the system 10. The frame 15 further includes a plurality of support rails 91 extending from the upper frame rails 90 to the ground rails 25. The combination of the ground rails 25, upper frame rails 90, support rails 91 upper cross-bar 93, and lower cross-bar 97 generally constitute the frame 15 and create a substantially rectangular and open shape, although other shapes and configurations are possible in accordance with the embodiments herein. The spacing of the support rails 91 is configured to accommodate side panels 95, which contain mesh wire or laser cut holes 96 therein. A plurality of substantially flat base members 92 may be attached underneath the ground rails 25 to provide stability for the frame 15 as well as allowing for mounting the frame 15 to the floor or an underlying platform (not shown).

The bucket 40 may comprise any suitable shape or configuration to allow it to accommodate the container 70. In an example, the bucket 40 may comprise an open front portion 85 comprising an angled front frame 86, an opened top portion 87, a closed bottom portion 88, and a partially closed side portion 89. The rear portion 52 of the bucket 40 is closed. The various open and closed portions of the bucket 40 allows for the container 70 to be easily loaded and unloaded from the bucket 40 and to ensure that the container 70 is safely retained in the bucket 40 during the tilting process without falling or becoming positionally unstable. The chute 45 may comprise any suitable shape or configuration to allow it to accommodate parcels (not shown) such as mail, envelopes, and packages, etc. that are disposed thereon and to permit these parcels to slide down the chute 45 when the chute 45 and bucket 40 (and a container 70 seated in the bucket 40) are in the tilting position to allow the container 70 to be loaded with the materials. In an example, the chute 45 may comprise a first sliding portion 100, an upright sidewall 105a, 105b extending from the first sliding portion 100, and a second sliding portion 110. The second sliding portion 110 is to telescopically extend into the bucket 40 in the completed tilt position. In another example, the upright sidewall 105a, 105b may also extend from the second sliding portion 110 to create a further elongated sidewall for the first sliding portion 100 and the second sliding portion 110.

A package infeed conveyor or mail sorter (not shown) may be positioned adjacent to the chute 45. More particularly, a package infeed conveyor or mail sorter may be positioned adjacent to the first sliding portion 100 of the chute 45. The package infeed conveyor may be any suitable type of infeed system used in the industry for delivering and loading parcels onto the chute 45. The upright sidewall 105a, 105b of the chute 45 allows the parcels to be retained in the chute 45 and while the parcels slide down the chute 45 without falling over the sides of the chute 45. Moreover, the second sliding portion 110 of the chute 45 permits a bridge from the chute 45 to the bucket 40 containing the container 70 such that the container 70 would be positioned near the second sliding portion 110 of the chute 110 to allow parcels sliding down the chute 45 to be loaded into the container 70 quickly and without falling to the ground. Moreover, the loading of the container 70 with the parcels sliding down the chute 45 occurs while the bucket 40 and chute 45 are in the tilting position to allow for a more complete and efficient loading of the container 70.

The system 10 may further comprise a control switch 115 to control the actuator mechanism 65. The control switch 115 may allow a user to manually turn on/off the switch and thus turn on/off the actuator mechanism 65 to begin/end the tilting process. In this regard, the control switch 115 may be communicatively connected to the actuator mechanism 65 to transmit signals to control the actuator mechanism 65. In other examples, the control switch 115 may be a programmable circuit that may be controlled locally or remotely using a computer, smartphone, or other communication device capable of running software that provides for instructions for controlling the actuator mechanism 65. In still other examples, the switch 115 may be a mechanical switch, electrical switch, electro-mechanical switch, magnetic switch, or optical switch. Furthermore, the electrical switch 115 may be wired or wirelessly connected to the actuator mechanism 65.

Another embodiment provides a sliding tilt loader apparatus 35 comprising a bucket 40, a chute 45, a pair of first pivot mechanisms 50a, 50b attached to a first end 51 of a rear portion 52 of the bucket 40, and a pair of second pivot mechanisms 55a, 55b attached to a second end 53 of the rear portion 52 of the bucket 40. The tilting of the chute 45 and the bucket 40 causes the chute 45 to angularly rotate and align with the bucket 40 until the chute 45 and bucket 40 reaches a completed tilt position.

The apparatus 35 may further comprise a pair of third pivot mechanisms 60a, 60b attached to a first end 121 of a rear portion 120 of the chute 45. The apparatus 35 may further comprise an actuator mechanism 65 operatively connected to the rear portion 52 of the bucket 40. The actuator mechanism 65 initiates the tilting of the bucket 40 causing the pair of first pivot mechanisms 50a, 50b and the second pair of pivot mechanisms 55a, 55b to rotate, and thereby causing the chute 45 to tilt with the bucket 40.

The apparatus 35 may further comprise a pair of linear actuators 125a, 125b attached to the rear portion 52 of the bucket 40, and a pair of linear actuator guides 130a, 130b operatively connected to the pair of linear actuators 125a, 125b. The pair of linear actuators 125a, 125b are to slide with respect to the pair of linear actuator guides 130a, 130b upon tilting of the bucket 40. Additionally, the pair of linear actuator guides 130a, 130b are attached to a plurality of side members 94 that are affixed to the support rails 91 of the frame 15, thereby retaining the pair of linear actuator guides 130a, 130b in position to accommodate the sliding action of the pair of linear actuators 125a, 125b therethrough. The pair of first pivot mechanisms 50a, 50b is to rotatably translate to allow the bucket 40 to tilt. The bucket 40 may be initially at rest at a horizontal position X (e.g., home (non-tilt) position) prior to tilting, and the pair of second pivot mechanisms 55a, 55b is to slide at a fixed angle θ to the horizontal position X. The pair of first pivot mechanisms 50a, 50b is to translate with respect to the horizontal position X upon tilting, and wherein the pair of first pivot mechanisms 50a, 50b remain at a stationary vertical position Z prior, during, and after tilting. The control switch 115 may also control the pair of linear actuators 125a, 125b, according to an example.

FIG. 1 is a schematic diagram illustrating a front perspective view of the system 10 in a home (non-tilt) position, according to an embodiment herein. In this position, the system 10 is at rest and the bucket 40 is ready to be loaded with a container 70 (not shown in FIG. 1), or perhaps the container 70 may have just been unloaded from the bucket 40 and as such the system 10 is not active. The bucket 40 and chute 45 are in their non-tilt positions such that the bucket 40 is positioned substantially flush to the ground (or platform) thereunder and the chute 45 is slightly angled but not in a full tilt position.

Figure 2:
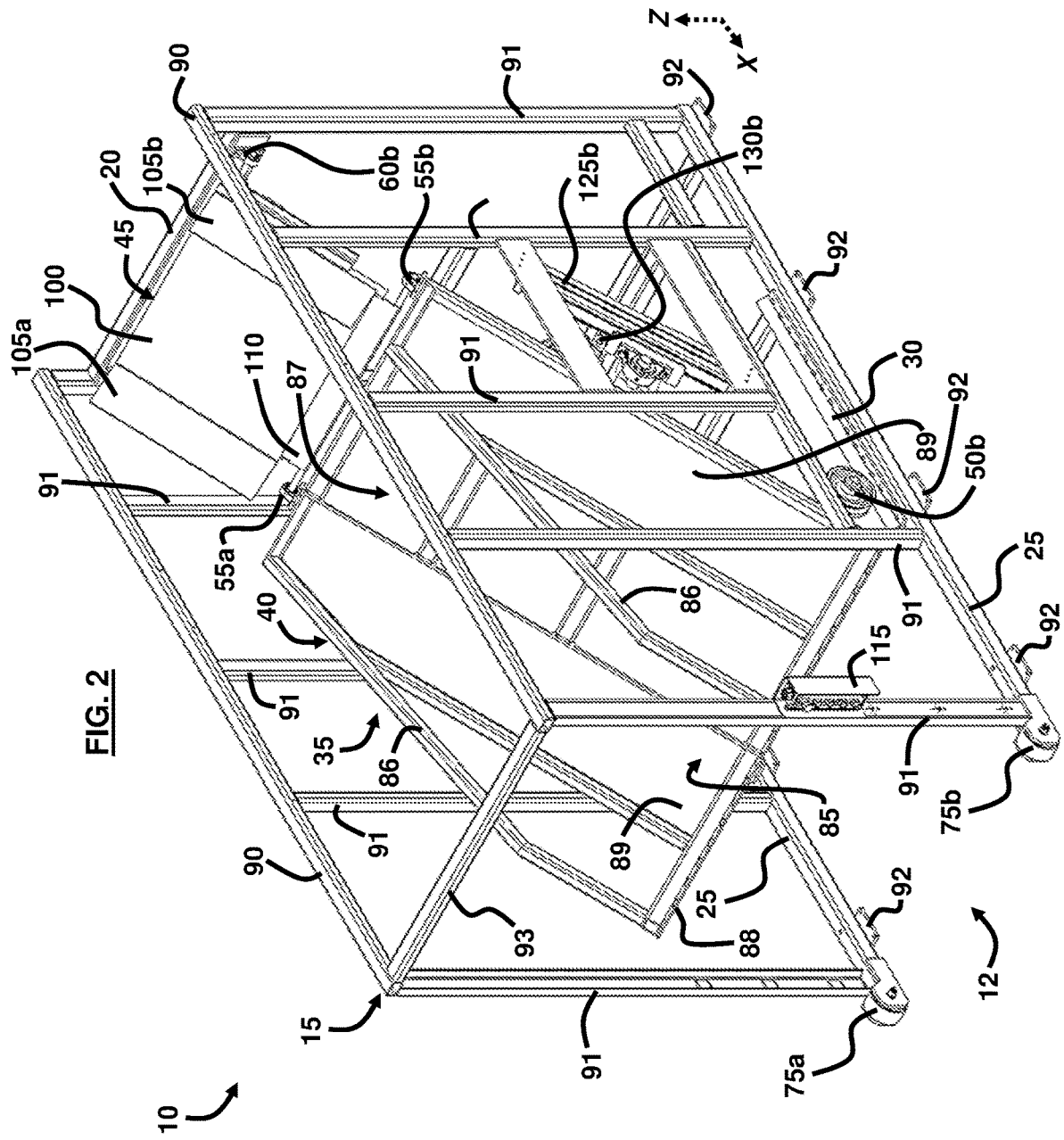
FIG. 2 is a schematic diagram illustrating a front perspective view of the system of FIG. 1 in a full tilt position, according to an embodiment herein.

FIG. 2 is a schematic diagram illustrating a front perspective view of the system 10 of FIG. 1 in a full tilt position, according to an embodiment herein. In this position, the system 10 is active and the bucket 40 may be loaded with a container 70 (not shown in FIG. 2). The bucket 40 and chute 45 are in their full tilt positions such that the bucket 40 is positioned angled with respect to the ground (or platform) thereunder (e.g., 45° angle, for example) and the chute 45 is similarly angled to allow parcels (not shown) to freely slide down the chute 45 into the container 70 positioned in the bucket 40.

FIG. 3 is a schematic diagram illustrating a rear perspective view of the system 10 of FIG. 1 in a full tilt position, according to an embodiment herein. Again, in this position, the system 10 is active and the bucket 40 may be loaded with a container 70 (not shown in FIG. 2). The bucket 40 and chute 45 are in their full tilt positions such that the bucket 40 is positioned angled with respect to the ground (or platform) thereunder (e.g., 45° angle, for example) and the chute 45 is similarly angled to allow parcels (not shown) to freely slide down the chute 45 into the container 70 positioned in the bucket 40. This view shows the actuator mechanism 65 supported by the cross rail 80 such that the actuator mechanism 65 may be a compression/extension member that contacts the bucket 40 to cause the tilting thereof. The first pivot mechanism 50a or 50b is to translate along the guide 30 which allows the bucket 40 to tilt to its full tilting position and since the second pivot mechanism 55a or 55b is also connected to the bucket 40, when the bucket 40 tilts, the second pivot mechanism 55a or 55b rotate thereby causing the chute 40, which is attached to the second pivot mechanism 55a or 55b to similarly tilt.

Figure 4:
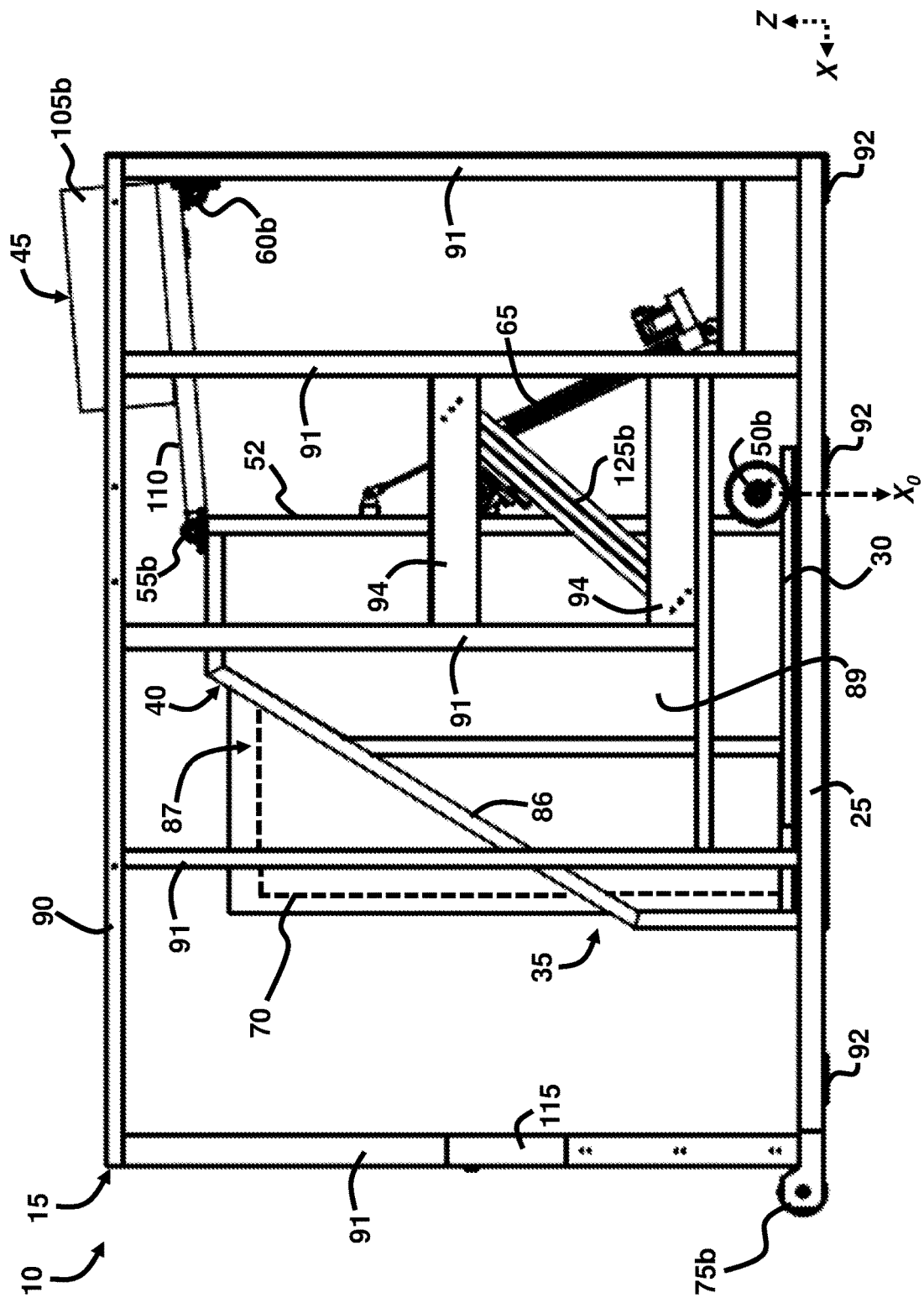
FIG. 4 is a schematic diagram illustrating a right side view of the system of FIG. 1 in a home (non-tilt) position, according to an embodiment herein.

FIG. 4 is a schematic diagram illustrating a right side view of the system 10 of FIG. 1 in a home (non-tilt) position, according to an embodiment herein. In this position, the system 10 is at rest and the bucket 40 is loaded with a container 70 and the system 10 is ready to be active. The bucket 40 and chute 45 are in their non-tilt positions such that the bucket 40 is positioned substantially flush to the ground (or platform) thereunder and the chute 45 is slightly angled but not in a full tilt position. The first pivot mechanism 50a or 50b has not translated along the guide 30 and as such is at position $X_0$ in FIG. 4.

FIG. 5 is a schematic diagram illustrating a right side view of the system 10 of FIG. 1 in a full tilt position, according to an embodiment herein. In this position, the system 10 is active and the bucket 40 is loaded with a container 70. The bucket 40 and chute 45 are in their full tilt positions such that the bucket 40 is positioned angled with respect to the ground (or platform) thereunder (e.g., 45° angle, for example) and the chute 45 is similarly angled to allow parcels (not shown) to freely slide down the chute 45 into the container 70 positioned in the bucket 40. The first pivot mechanism 50a or 50b has translated along the guide 30 and as such is at position X/in FIG. 5.

Figure 6:
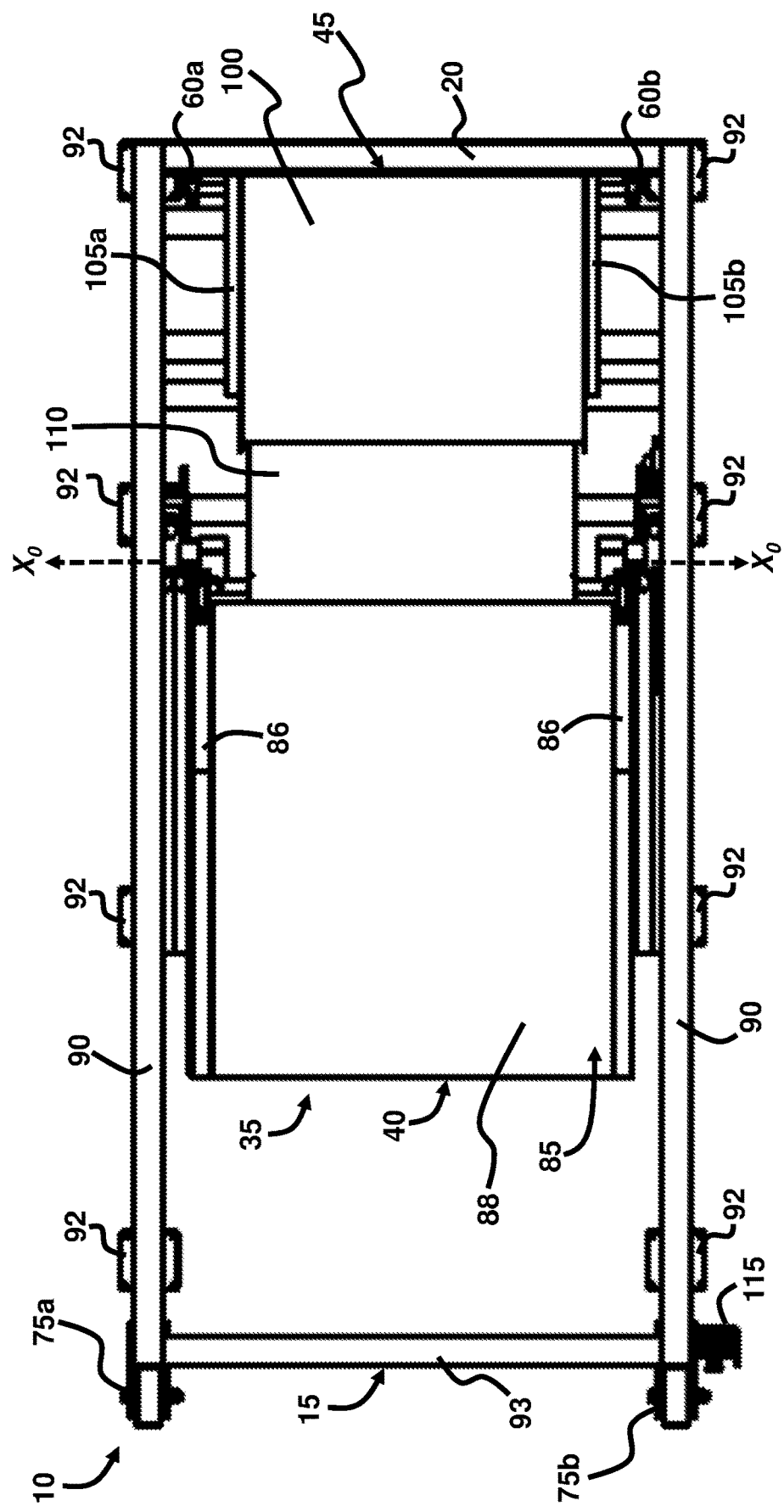
FIG. 6 is a schematic diagram illustrating a top view of the system of FIG. 1 in a home (non-tilt) position, according to an embodiment herein.

FIG. 6 is a schematic diagram illustrating a top view of the system 10 of FIG. 1 in a home (non-tilt) position, according to an embodiment herein. The bucket 40 and chute 45 are in their non-tilt positions such that the bucket 40 is positioned substantially flush to the ground (or platform) thereunder and the chute 45 is slightly angled but not in a full tilt position. The first pivot mechanism 50a or 50b has not translated along the guide 30 and as such is at position $X_0$ in FIG. 6.

Figure 7:
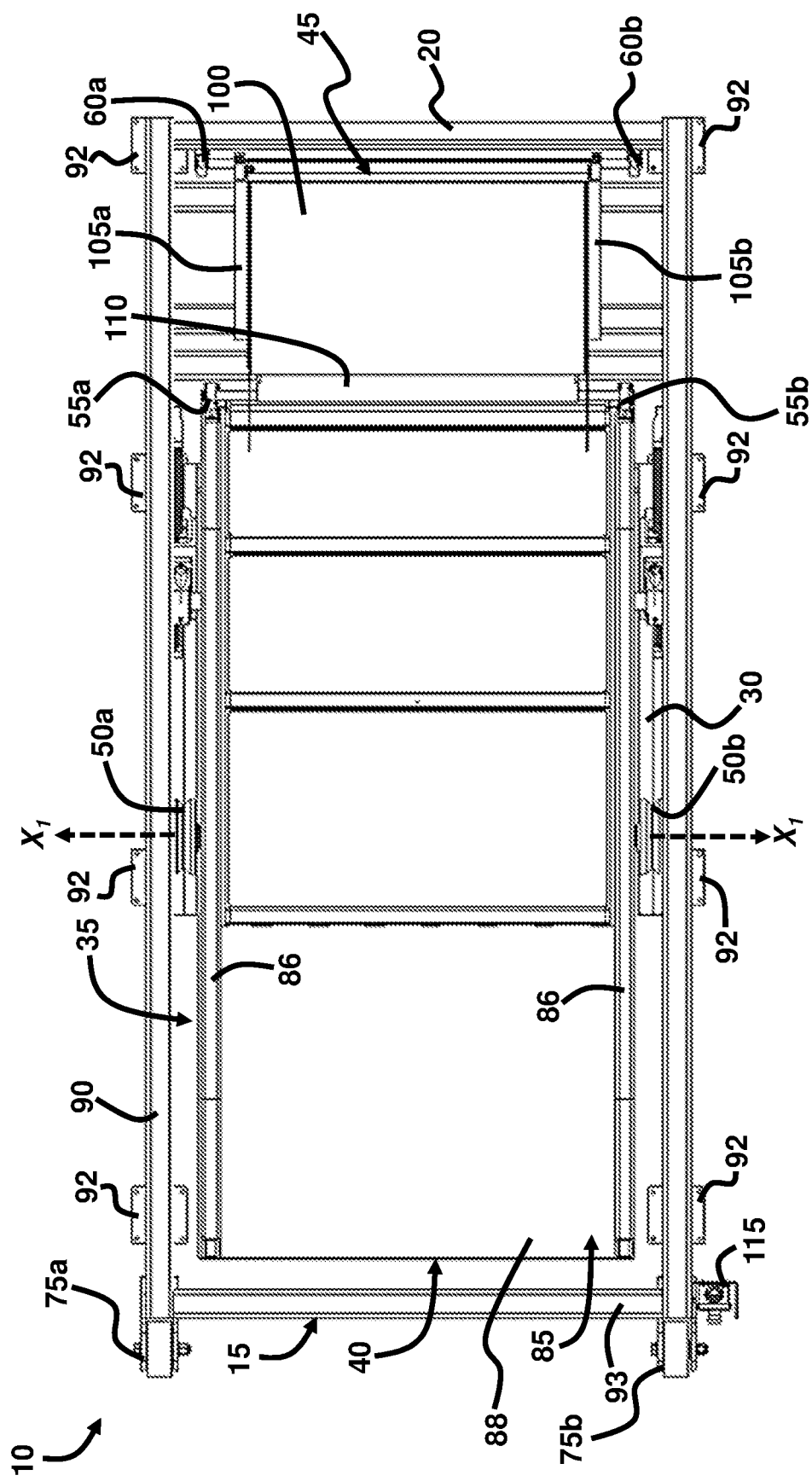
FIG. 7 is a schematic diagram illustrating a top view of the system of FIG. 1 in a full tilt position, according to an embodiment herein.

FIG. 7 is a schematic diagram illustrating a top view of the system 10 of FIG. 1 in a full tilt position, according to an embodiment herein. The bucket 40 and chute 45 are in their full tilt positions such that the bucket 40 is positioned angled with respect to the ground (or platform) thereunder (e.g., 45° angle, for example) and the chute 45 is similarly angled to allow parcels (not shown) to freely slide down the chute 45 into the container 70 (not shown in FIG. 7) positioned in the bucket 40. The first pivot mechanism 50a or 50b has translated along the guide 30 and as such is at position X/in FIG. 7.

Figure 8:
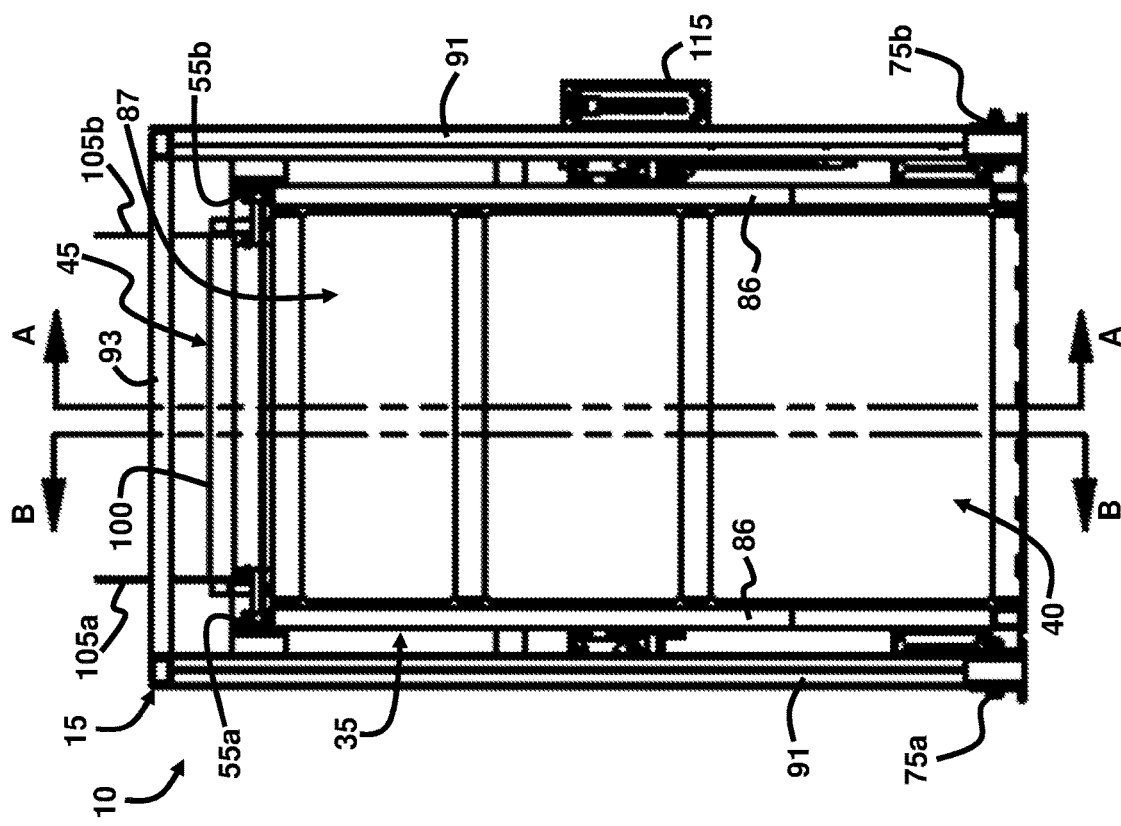
FIG. 8 is a schematic diagram illustrating a front view of the system of FIG. 1 in a home (non-tilt) position, according to an embodiment herein.

FIG. 8 is a schematic diagram illustrating a front view of the system 10 of FIG. 1 in a home (non-tilt) position, according to an embodiment herein. The control switch 115 is shown attached to one of the support rails 91. However, the control switch 115 may be positioned at any suitable location including being remotely located from the apparatus 35, and thus the control switch 115 does not necessarily have to be attached to one of the support rails 91. Cut lines A-A and B-B are provided in FIG. 8, with their corresponding cross-sectional views further illustrated in FIGS. 10 and 11, respectively.

Figure 9:
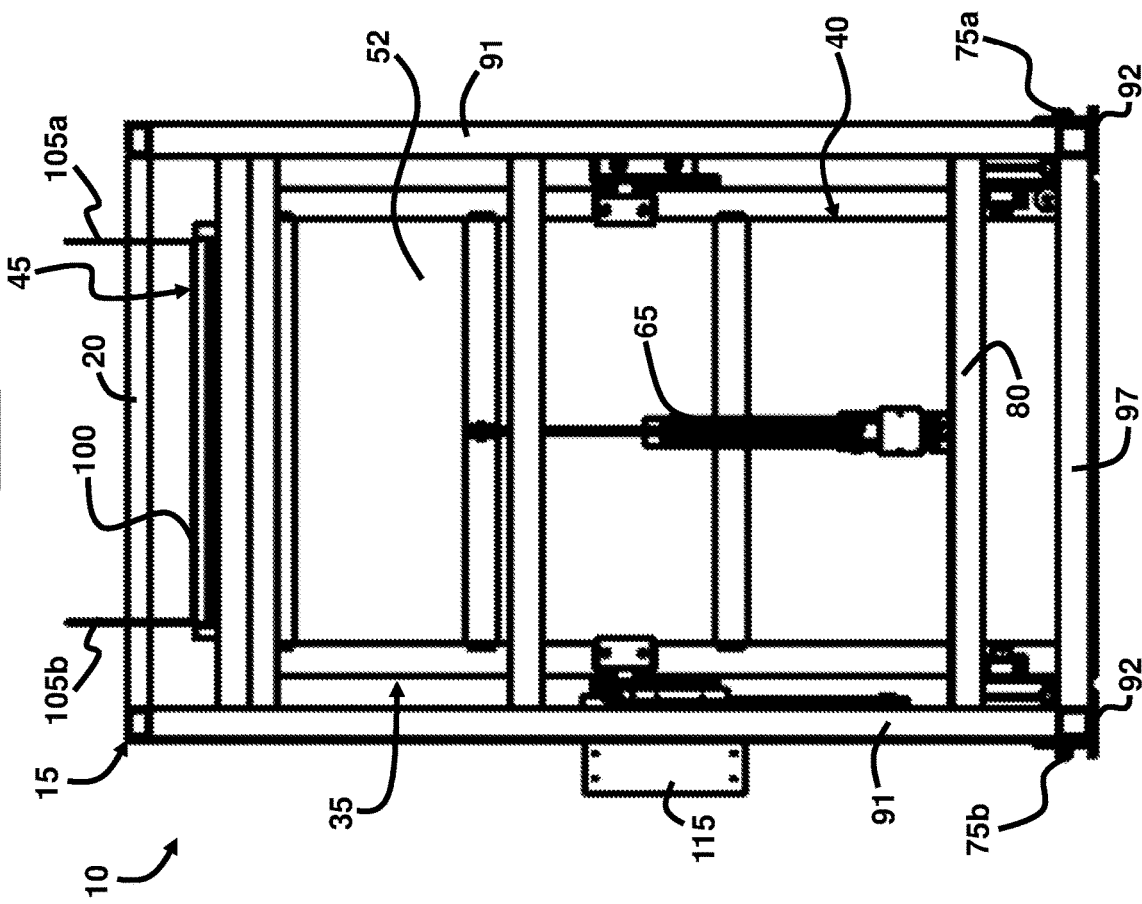
FIG. 9 is a schematic diagram illustrating a rear view of the system of FIG. 1 in a home (non-tilt) position, according to an embodiment herein.

FIG. 9 is a schematic diagram illustrating a rear view of the system 10 of FIG. 1 in a home (non-tilt) position, according to an embodiment herein. The bucket 40 and chute 45 are in their non-tilt positions such that the bucket 40 is positioned substantially flush to the ground (or platform) thereunder and the chute 45 is slightly angled but not in a full tilt position. In an example, the actuator mechanism 65 is configured as a rod-and-piston mechanism and is connected to the cross rail 80 on one end and the rear portion 52 of the bucket 40, and as such the actuator mechanism 65 is in an extension configuration (as a rod-and-piston). When the bucket 40 tilts, then the actuator mechanism 65 would articulate into the compression configuration (as a rod-andpiston). In FIGS. 8 and 9, the upright sidewall 105a, 105b of the chute 45 extends over the top of the frame 15 (e.g., over the back rail 20 and upper cross-bar 93). With the exception of the upright sidewall 105a, 105b of the chute 45, the various components of the apparatus 35 are generally constrained within the frame 15.

Figure 10:
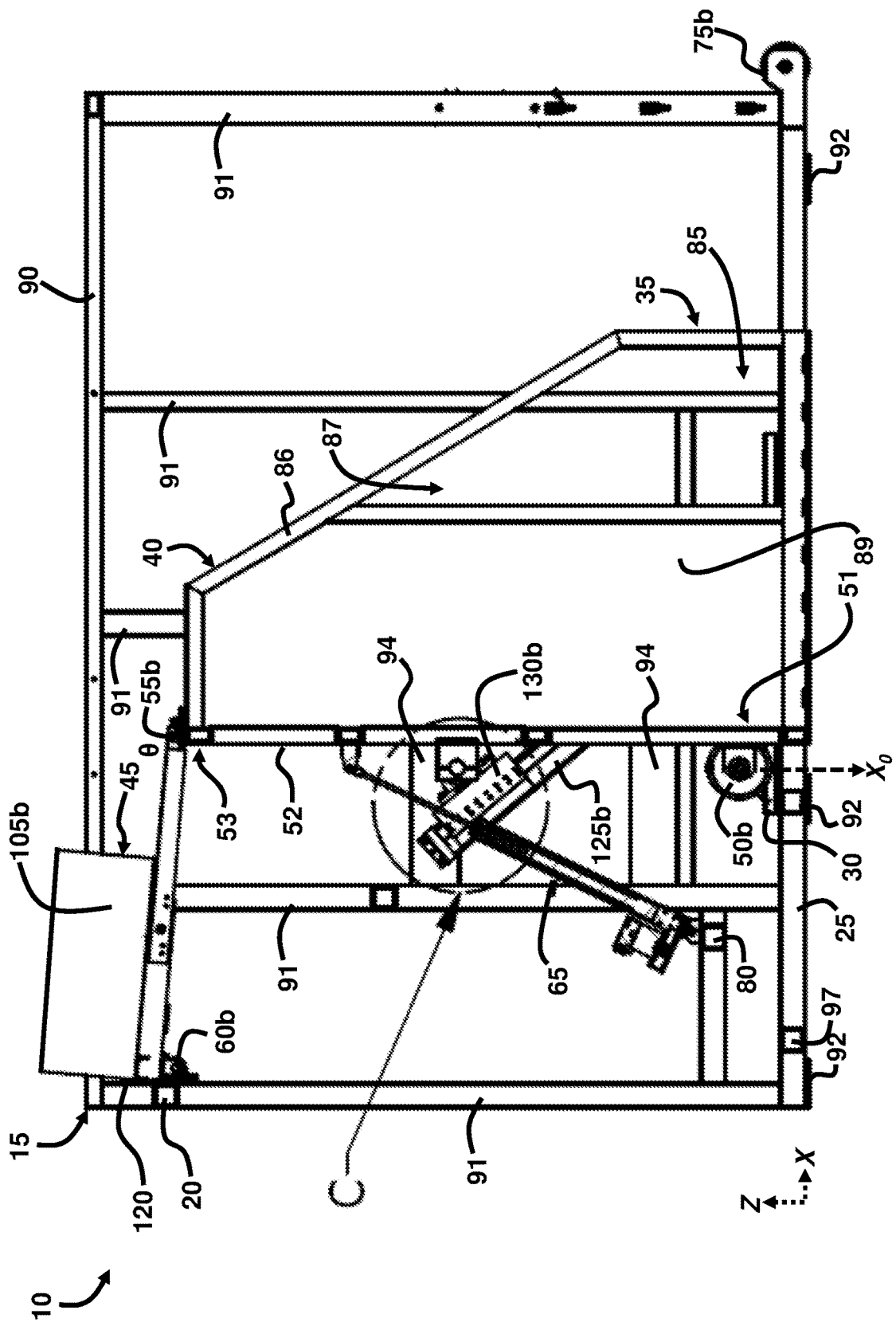
FIG. 10 is a schematic diagram illustrating a cross-sectional left side view of the system of FIG. 1 in a home (non-tilt) position and cut along line A-A of FIG. 8, according to an embodiment herein.

FIG. 10 is a schematic diagram illustrating a cross-sectional left side view of the system 10 of FIG. 1 in a home (non-tilt) position and cut along line A-A of FIG. 8, according to an embodiment herein. The bucket 40 and chute 45 are in their non-tilt positions such that the bucket 40 is positioned substantially flush to the ground (or platform) thereunder and the chute 45 is slightly angled but not in a full tilt position. The first pivot mechanism 50a or 50b (only first pivot mechanism 50b is shown in FIG. 10) has not translated along the guide 30 and as such is at position $X_0$ in FIG. 10. The pair of linear actuators 125a, 125b and the respective the pair of linear actuator guides 130a, 130b (only linear actuator 125b and linear actuator guide 130b are shown in FIG. 10) are shown in an encircled area denoted as "C", which is further magnified in FIG. 12.

Figure 11:
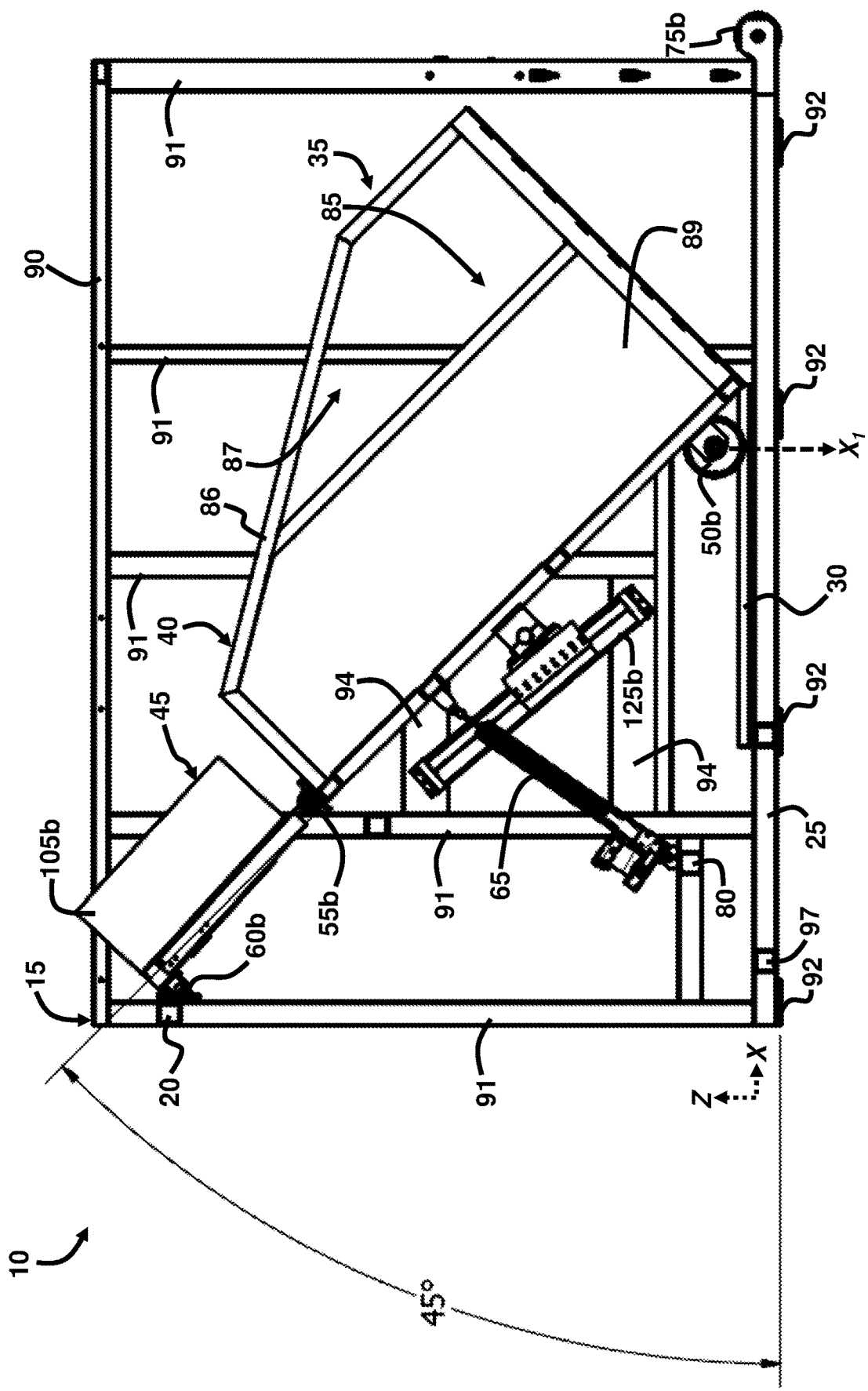
FIG. 11 is a schematic diagram illustrating a cross-sectional left side view of the system of FIG. 1 in a full tilt position and cut along line B-B of FIG. 8, according to an embodiment herein.

FIG. 11 is a schematic diagram illustrating a cross-sectional left side view of the system 10 of FIG. 1 in a full tilt position and cut along line B-B of FIG. 8, according to an embodiment herein. The bucket 40 and chute 45 are in their full tilt positions such that the bucket 40 is positioned angled with respect to the ground (or platform) thereunder (e.g., 45° angle, for example) and the chute 45 is similarly angled to allow parcels (not shown) to freely slide down the chute 45 into the container 70 (not shown in FIG. 11) positioned in the bucket 40. The first pivot mechanism 50a or 50b (only first pivot mechanism 50b is shown in FIG. 11) has translated along the guide 30 and as such is at position $X_1$ in FIG. 11.

Figure 12:
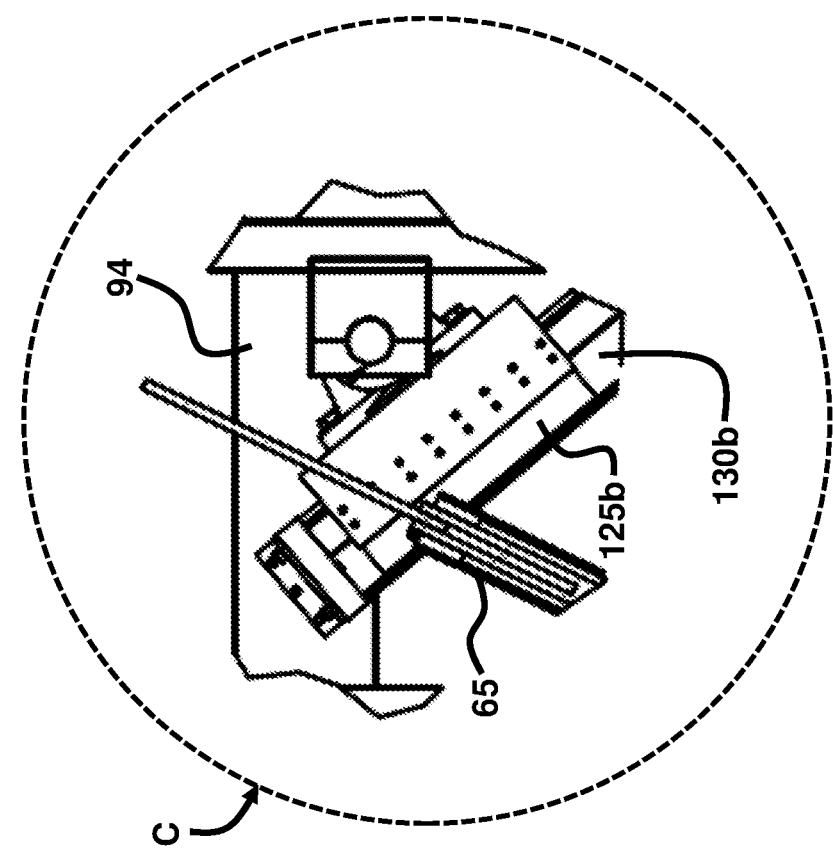
FIG. 12 is a schematic diagram illustrating a magnified detailed view of encircled area C of FIG. 10, according to an embodiment herein.

FIG. 12 is a schematic diagram illustrating a magnified detailed view of encircled area C of FIG. 10, according to an embodiment herein. This magnified view further illustrates the pair of linear actuators 125a, 125b and the respective the pair of linear actuator guides 130a, 130b (only linear actuator 125b and linear actuator guide 130b are shown in FIG. 12). In this view, the actuator mechanism 65 is shown crossing in front of the linear actuator 125b and linear actuator guide 130b. In an example, the pair of linear actuators 125a, 125b may be connected to or part of the pair of linear actuator guides 130a, 130b, respectively as one unit. The actuator mechanism 65 is independent of the pair of linear actuators 125a, 125b. Moreover, the actuator mechanism 65 drives the movement of the pair of linear actuators 125a, 125b; e.g., to move the pair of linear actuators 125a, 125b up/down.

Figure 13:
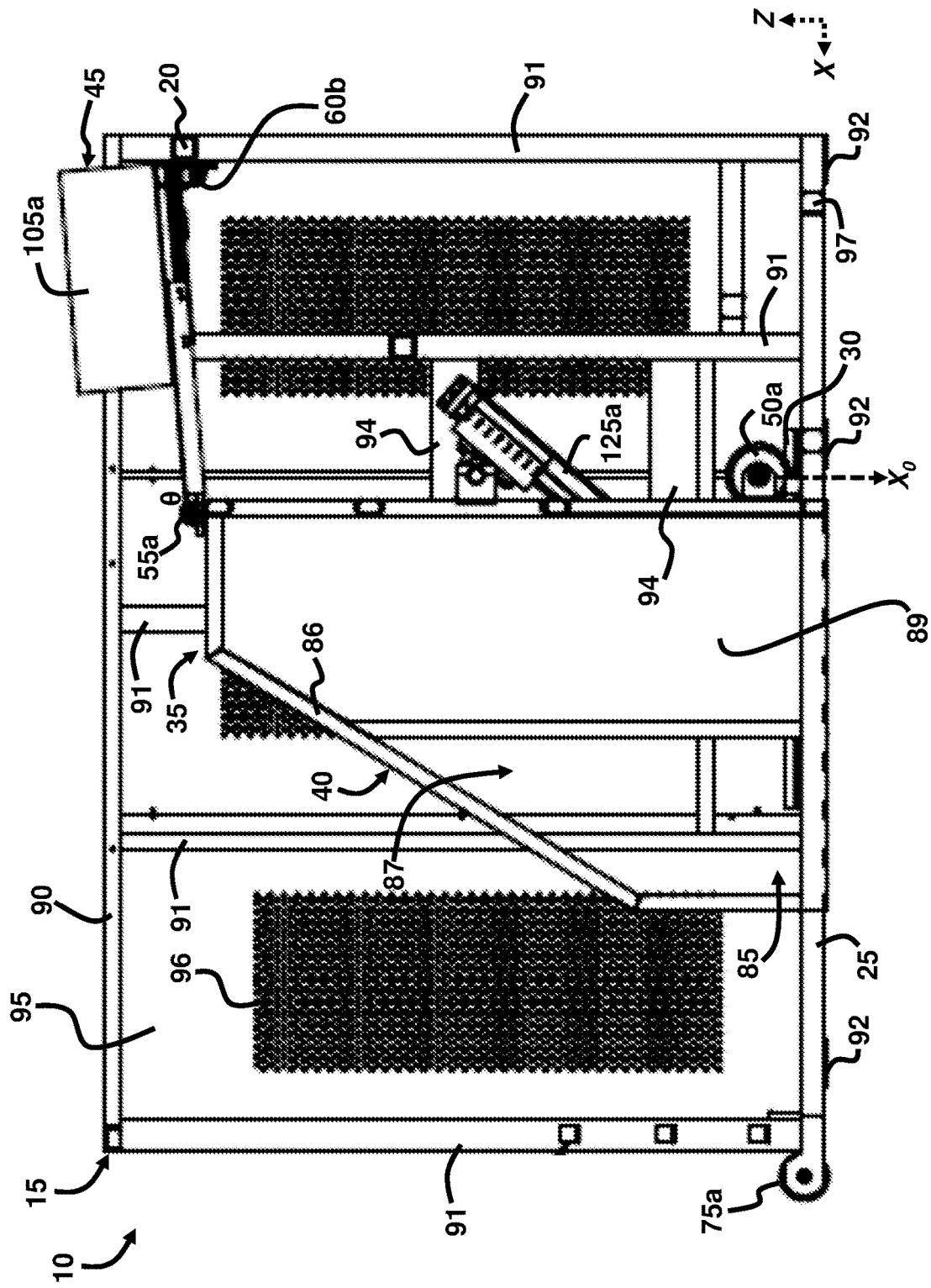
FIG. 13 is a schematic diagram illustrating a cross-sectional right side view of the system of FIG. 1 in a home (non-tilt) position and cut along line B-B of FIG. 8, according to an embodiment herein.

FIG. 13 is a schematic diagram illustrating a cross-sectional right side view of the system 10 of FIG. 1 in a home (non-tilt) position and cut along line B-B of FIG. 8, according to an embodiment herein. The bucket 40 and chute 45 are in their non-tilt positions such that the bucket 40 is positioned substantially flush to the ground (or platform) thereunder and the chute 45 is slightly angled but not in a full tilt position. The first pivot mechanism 50a or 50b (only first pivot mechanism 50a is shown in FIG. 13) has not translated along the guide 30 and as such is at position $X_0$ in FIG. 13. The side panels 95 with mesh wire or laser cut holes 96 are shown installed on the frame 15 and positioned between the support rails 91. Furthermore, there may be any suitable number of side panels 95 installed on the frame 15.

Figure 14:
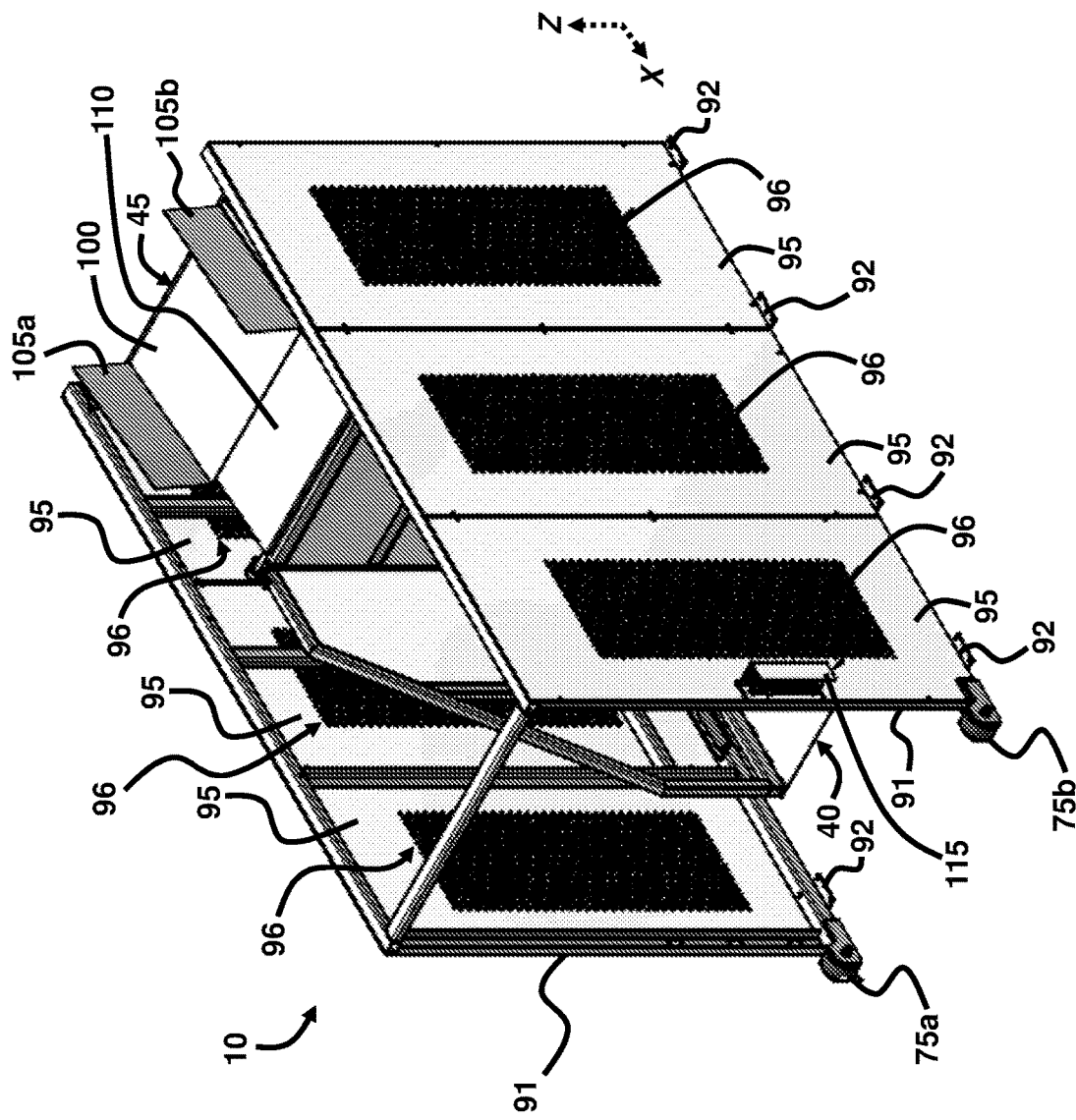
FIG. 14 is a schematic diagram illustrating a front perspective view of a system, with side panels installed, in a home (non-tilt) position, according to an embodiment herein.
Figure 15:
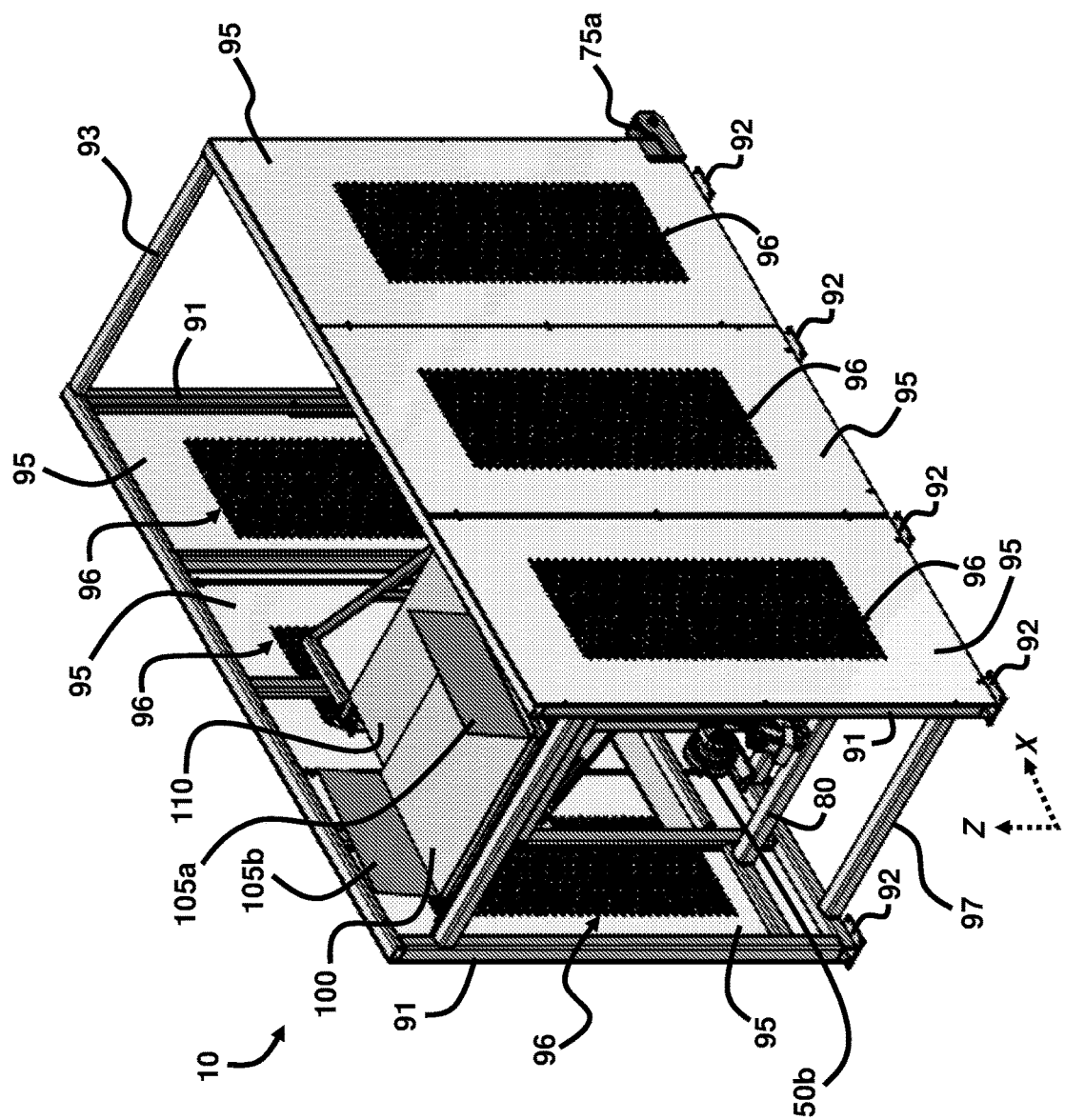
FIG. 15 is a schematic diagram illustrating a rear perspective view of a system, with side panels installed, in a home (non-tilt) position, according to an embodiment herein.

FIG. 14 is a schematic diagram illustrating a front perspective view of a system 10, with side panels 95 installed, in a home (non-tilt) position, according to an embodiment herein. FIG. 15 is a schematic diagram illustrating a rear perspective view of a system 10, with side panels 95 installed, in a home (non-tilt) position, according to an embodiment herein. The side panels 95 provide an enclosure for the frame 15 to keep the system 10 and apparatus 35 confined within the boxed-in enclosure created by the frame 15 and side panels 95. The mesh wire or laser cut holes 96 permits users to view the tilting process and loading of a container 70 with parcels, but the side panels 95 provide a safety feature to ensure users or adjacent equipment are safe and unharmed during the tilting process and parcel loading of the container 70.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system comprising:
    a frame comprising:
        a back rail;
        a ground rail, wherein the back rail and the ground rail are positioned transverse to each other; and
        a guide attached to the ground rail;
    a sliding tilt loader apparatus comprising:
        a bucket;
        a chute;
        a first pivot mechanism attached to a first end of a rear portion of the bucket, wherein the first pivot mechanism is to translate along the guide;
        a second pivot mechanism attached to a second end of the rear portion of the bucket and a front portion of the chute; and
        a third pivot mechanism attached to a first end of a rear portion of the chute,
    wherein rotation of the first pivot mechanism and the second pivot mechanism coincide with tilting of the chute and the bucket causing the chute to angularly rotate and align with the bucket upon the chute and bucket reaching a completed tilt position.

2. The system of claim 1, wherein the third pivot mechanism is attached to the back rail.

3. The system of claim 1, further comprising an actuator mechanism operatively connected to the rear portion of the bucket, wherein the actuator mechanism initiates the tilting of the bucket causing the first pivot mechanism and the second pivot mechanism to rotate, and thereby causing the chute to tilt with the bucket.

4. The system of claim 1, wherein the bucket is to accommodate a container that tilts along with the bucket, and wherein the chute is to angularly align with the container upon the chute and the bucket reaching the completed tilt position.

5. The system of claim 1, wherein the first pivot mechanism is to rotatably translate to allow the bucket to tilt.

6. The system of claim 1, wherein the completed tilt position comprises 45°.

7. The system of claim 1, further comprising a wheel attached to the ground rail.

8. The system of claim 3, wherein the frame further comprises a cross rail positioned transverse to the ground rail and parallel to the back rail.

9. The system of claim 8, wherein the actuator mechanism is attached to the cross rail.

10. The system of claim 1, wherein the bucket comprises:
an open front portion comprising an angled front frame;
an opened top portion;
a closed bottom portion; and
a partially closed side portion,
wherein the rear portion is closed.

11. The system of claim 1, wherein the chute comprises:
a first sliding portion;
an upright sidewall extending from the first sliding portion; and
a second sliding portion,
wherein the second sliding portion is to telescopically extend into the bucket in the completed tilt position.

12. The system of claim 3, further comprising a control switch to control the actuator mechanism.

13. A sliding tilt loader apparatus comprising:
a bucket;
a chute;
a pair of first pivot mechanisms attached to a first end of a rear portion of the bucket;
a pair of second pivot mechanisms attached to a second end of the rear portion of the bucket and a front portion of the chute; and
a pair of third pivot mechanisms attached to a first end of a rear portion of the chute,
wherein tilting of the chute and the bucket causes the chute to angularly rotate and align with the bucket until the chute and bucket reaches a completed tilt position.

14. The apparatus of claim 13, further comprising an actuator mechanism operatively connected to the rear portion of the bucket, wherein the actuator mechanism initiates the tilting of the bucket causing the pair of first pivot mechanisms and the second pair of pivot mechanisms to rotate, and thereby causing the chute to tilt with the bucket.

15. The apparatus of claim 13, further comprising:
a pair of linear actuators attached to the rear portion of the bucket; and
a pair of linear actuator guides operatively connected to the pair of linear actuators,
wherein the pair of linear actuators are to slide with respect to the pair of linear actuator guides upon tilting of the bucket.

16. The apparatus of claim 13, wherein the pair of first pivot mechanisms is to rotatably translate to allow the bucket to tilt.

17. The apparatus of claim 13, wherein the bucket is initially at rest at a horizontal position prior to tilting, and wherein the pair of second pivot mechanisms is to slide at a fixed angle to the horizontal position.

18. The apparatus of claim 17, wherein the pair of first pivot mechanisms is to translate with respect to the horizontal position upon tilting, and wherein the pair of first pivot mechanisms remain at a stationary vertical position prior, during, and after tilting.

* * * * *